(12) United States Patent
Ozawa et al.

(10) Patent No.: US 12,517,675 B2
(45) Date of Patent: Jan. 6, 2026

(54) DATA PROCESSING APPARATUS AND DATA PROCESSING METHOD

(71) Applicant: Hitachi, Ltd., Tokyo (JP)

(72) Inventors: Mayuko Ozawa, Tokyo (JP); Norifumi Nishikawa, Tokyo (JP); Yoshiki Kurokawa, Tokyo (JP); Kazuhiko Mogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/830,800

(22) Filed: Sep. 11, 2024

(65) Prior Publication Data

US 2025/0110659 A1  Apr. 3, 2025

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS 5,822,780 A  10/1998  Schutzman

FOREIGN PATENT DOCUMENTS

CN  103902260 A  *  7/2014

* cited by examiner

*Primary Examiner* — Brian R Peugh (74) *Attorney, Agent, or Firm* — MATTINGLY & MALUR, PC (57) ABSTRACT

A data processing apparatus has a memory and a first storage apparatus and reads a data area from a second storage apparatus (a storage apparatus which is slower than the first storage apparatus and stores a plurality of data areas as data constituent elements). Regarding each processing block, the data processing apparatus determines whether an open/closed area for processing of a first processing block which is the processing block should be an entire area or a partial area of the data area, based on whether or not the data area which is input and/or output by the processing of the first processing block can also be accessed by processing of a second processing block which is a processing block other than the first processing block, and whether or not the second processing block is being executed.

11 Claims, 7 Drawing Sheets

Table-State Management Array  24

| Query Number | Table Identifier | Open/Closed Type | Read/Write | Operating Flag | Shared Counter | Mode |
|---|---|---|---|---|---|---|
| 1 | A | Partly Open | Read | True | 0 | 6 |
| 1 | B | Entirely Open | Read | True | 3 | 5 |
| 2 | B | Entirely Open | Read | True | 3 | 5 |
| 3 | B | Entirely Open | Read | True | 3 | 5 |
| 4 | B | Entirely Open | Read | True | 3 | 5 |
| 4 | C | Entirely Open | Read & Write | False | 1 | 1 |
| 5 | C | Entirely Open | Read & Write | True | 1 | 1 |
| : | : | : | : | : | : | : |
| 301 | 302 | 303 | 304 | 305 | 306 | 307 |

Cache File of Table A 131A

| A_orderdate | A_orderkey |
|---|---|
| 1999-10-10 | 100 |
| 1999-10-29 | 55 |
| 1999-11-15 | 21 |
| 1999-12-01 | 76 |
| | : |
| 2000-01-03 | 83 |
| 2000-01-07 | 33 |

FIG. 2B

Cache File of Table B 131B

| B_itemnumber | B_orderkey |
|---|---|
| 5 | 100 |
| 35 | 55 |
| 77 | 21 |
| 89 | 76 |
| | : |
| 101 | 83 |
| 7 | 33 |

FIG. 3

Table-State Management Array 24

| Query Number | Table Identifier | Open/Closed Type | Read/Write | Operating Flag | Shared Counter | Mode |
|---|---|---|---|---|---|---|
| 1 | A | Partly Open | Read | True | 0 | 6 |
| 1 | B | Entirely Open | Read | True | 3 | 5 |
| 2 | B | Entirely Open | Read | True | 3 | 5 |
| 3 | B | Entirely Open | Read | True | 3 | 5 |
| 4 | B | Entirely Open | Read | True | 3 | 5 |
| 4 | C | Entirely Open | Read & Write | False | 1 | 1 |
| 5 | C | Entirely Open | Read & Write | True | 1 | 1 |
| .. | .. | .. | .. | .. | .. | .. |
| 301 | 302 | 303 | 304 | 305 | 306 | 307 |

DATA PROCESSING APPARATUS AND DATA PROCESSING METHOD

CROSS-REFERENCE TO PRIOR APPLICATION

This application relates to and claims the benefit of priority from Japanese Patent Application number 2023-171509, filed on Oct. 2, 2023 the entire disclosure of which is incorporated herein by reference.

BACKGROUND

The present invention generally relates to data processing and more particularly to data area opening/closing management.

As a data area(s) that is a logical area(s) where data is stored, for example, there is a file(s) in a file system or a table(s) in a database. A data area may be called a data aggregate; and when it is opened, data as its content can be written and/or read. In other words, while the data area is closed, the data as its contents cannot be written or read.

Regarding the data area management, for example, there is a technique described in U.S. Pat. No. 5,822,780. According to this patent document, a hierarchical database is divided into several data areas, the last access time is retained for each divided data area, and whether the relevant data area is online or not is judged.

SUMMARY

There is a demand for the development of a cache system which uses an object storage in order to realize cloud services in the database field. In particular, when there are a plurality of multi-processes and cache files, it is an object to secure safety and reduce memory usage while maintaining a processing speed.

Methods for opening/closing a cache file are a method of opening the cache file every time it is accessed (for example, every time it is accessed according to a query plan of a query), and a method of keeping the cache file open during processing of the cache file (for example, processing according to the entire query plan of the query). The former method is to close the cache file during a time slot(s) when the cache file is not accessed. The latter method is to keep the cache file open even if there is any time slot during which the cache file is not accessed.

If the former method is employed, the processing speed of the data processing decreases. This is because when different processes access the same cache file at different times, it becomes necessary to open/close the cache file frequently.

If the latter method is employed, frequent opening/closing of the cache file can be avoided; however, there is a possibility that upon the occurrence of a failure, you cannot tell whether a written state of many cache files is correct or not; and a large amount of a main memory (for example, a work area) will be consumed. This is because when a cache file is opened, data in the cache file is written to the main memory and the data in the cache file exists in the main memory while the cache file is open.

Accordingly, there is a trade-off between the processing speed, the reliability, and the memory usage regarding opening/closing of the cache file(s). Moreover, such a problem may also occur regarding data areas other than the cache files.

A data processing apparatus has a memory and a first storage apparatus and reads a data area(s) from a second storage apparatus (that is a storage apparatus whose speed is slower than that of the first storage apparatus and which stores a plurality of data areas as data constituent elements). Regarding each processing block, the data processing apparatus determines whether an open/closed area for processing of a first processing block which is the processing block should be an entire area or a partial area of the data area, based on whether or not the data area which is input and/or output by the processing of the first processing block can also be accessed by processing of a second processing block which is a processing block other than the first processing block, and whether or not the second processing block is being executed.

According to the present invention, it is possible to realize opening/closing of the data area(s), which makes the processing speed, the reliability, and the memory usage appropriate. Problems, configurations, and effects other than those described above will be clarified in the following description of embodiments.

DESCRIPTION OF EMBODIMENTS

Embodiments of the present invention will be described below with reference to the drawings. Incidentally, the embodiments described below are not intended to limit the claimed invention and not all of the elements and combinations thereof described in the embodiments are essential for the solution of the invention.

In the description indicated below, an "interface apparatus" may be one or more interface devices. The one or more interface devices may be at least one of the following:

An I/O interface device(s) that is one or more I/O (Input/Output) interface devices. The I/O (Input/Output) interface device is an interface device for at least one of an I/O device and a remote display computer. The I/O interface device for the display computer may be a communication interface device. At least one I/O device may be a user interface device, for example, either one of input devices such as a keyboard and a pointing device, and output devices such as a display device.

A communication interface device(s) that is one or more communication interface devices. The one or more communication interface devices may be one or more communication interface devices of the same type (for example, one or more NICs [Network Interface Cards]) or two or more communication interface devices of different types (for example, an NIC and an HBA [Host Bus Adapter]).

Furthermore, in the description indicated below, a "memory" is one or more memory devices, which are an example of one or more storage devices, and may typically be a main storage device. At least one memory device in the memory may be a volatile memory device or a nonvolatile memory device.

Furthermore, in the description indicated below, a "persistent storage apparatus" is one or more persistent storage devices which are an example of one or more storage devices. The persistent storage device is typically a nonvolatile storage device (such as an auxiliary storage device) and is specifically, for example, an HDD (Hard Disk Drive), an SSD (Solid State Drive), an NVME (Non-Volatile Memory Express) drive, or an SCM (Storage Class Memory).

Furthermore, in the description indicated below, a "storage apparatus" may be a memory and at least a memory for the persistent storage apparatus.

Furthermore, in the description indicated below, a "processor" may be one or more processor devices. At least one processor device may typically be a microprocessor device like a CPU (Central Processing Unit), but may also be another type of processor device such as a GPU (Graphics Processing Unit). At least one processor device may be single-core or multi-core. At least one processor device may be a processor core. At least one processor device may be a processor device in a broad sense such as a circuit which is an aggregate of gate arrays in a hardware description language which performs part or all of processing (for example, FPGA [Field-Programmable Gate Array]), CPLD (Complex Programmable Logic Device), or ASIC (Application Specific Integrated Circuit)).

Furthermore, in the description indicated below, a function may be sometimes described by an expression like "yyy unit"; however, the function may be implemented by execution of one or more computer programs by a processor, or may be implemented by one or more hardware circuits (such as FPGA or ASIC), or may be implemented by a combination of the above. If the function is implemented by the execution of a program by the processor, specified processing is performed by using, for example, storage apparatuses and/or interface apparatuses as appropriate and, therefore, the function may be considered as at least part of the processor. The processing explained by referring to the function as a subject may be the processing executed by the processor or an apparatus which has that processor. The program may be installed from a program source. The program source may be, for example, a program distribution computer or a computer-readable storage medium (such as a non-transitory storage medium). An explanation of each function is one example, and a plurality of functions may be gathered as one function or one function may be divided into a plurality of functions.

Moreover, in the following description, when an explanation is provided about elements of the same type by not distinguishing them, a common sign in reference numerals are used; and when the elements of the same type are distinguished, the reference numerals may be used.

Figure 1:
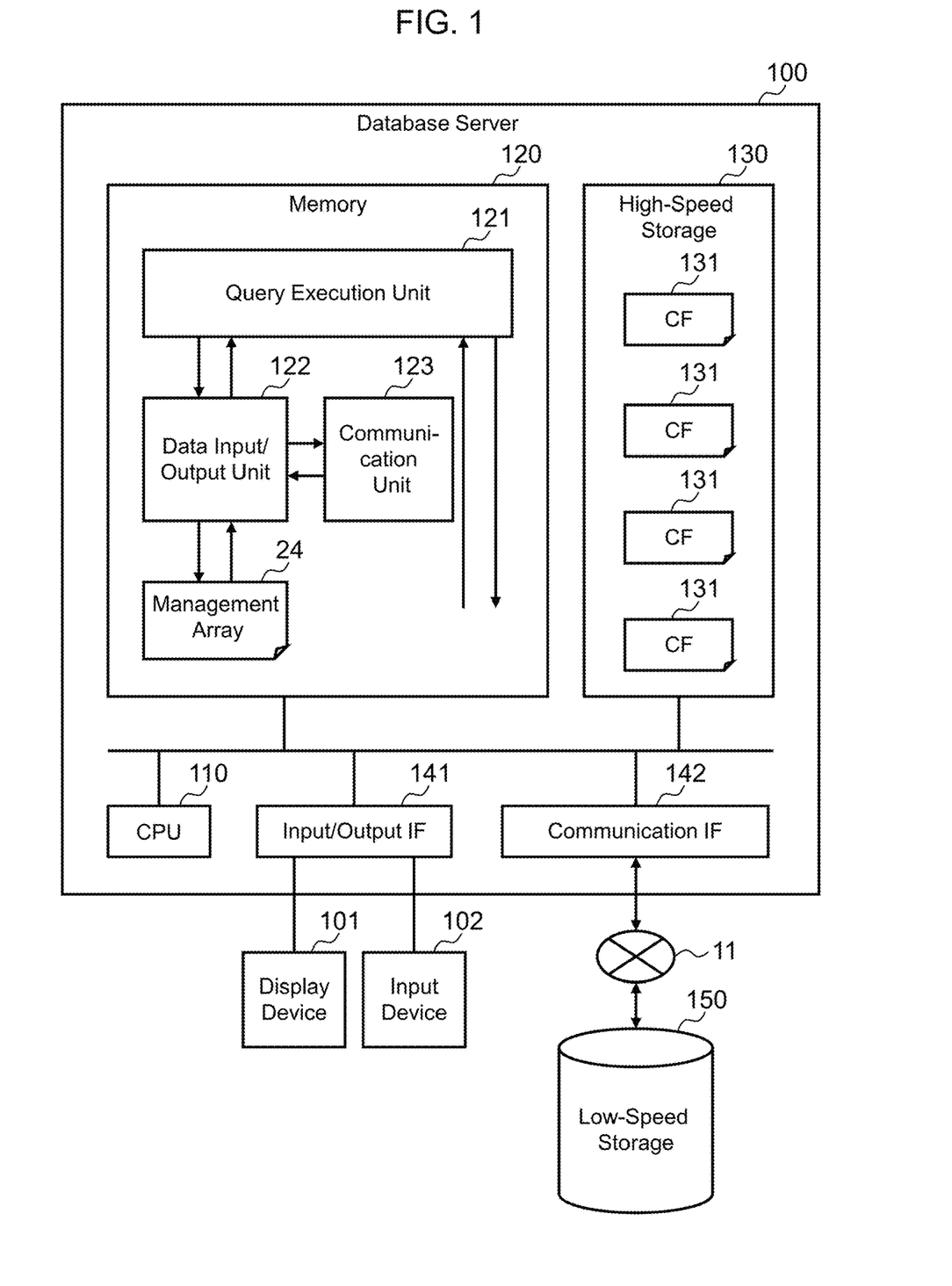
FIG. 1 illustrates a configuration diagram of a database server according to an embodiment.

FIG. 1 is a configuration example of a database server according to an embodiment.

A database server 100 (an example of a data processing apparatus) is an apparatus for inputting/outputting data to/from a database. The database server 100 is an on-premises server, but it may be a server in a cloud such as a public cloud or a private cloud instead of the on-premises server. The database server 100 has a memory 120, a high-speed storage 130, an input/output interface 141, a communication interface 142, and a CPU 110 coupled to them. The memory 120 and the high-speed storage 130 may be an example of storage apparatuses. The input/output interface 141 and the communication interface 142 may be an example of interface apparatuses. The CPU 110 may be an example of processors.

The database server 100 is coupled to a display device 101 and an input device 102 through the input/output interface 141. The display device 101 may be a liquid crystal panel and the input device 102 may be a keyboard, a mouse, etc.

The communication interface 142 communicates with a low-speed storage 150 via a network 11. Incidentally, the communication interface 142 may communicate with a client terminal operated by an operator (for example, a computer such as a personal computer and a smartphone). Specifically speaking, the operator may use the display device 101 and the input device 102, or alternatively or additionally may use a remote client terminal. Moreover, at least part of a database which stores target data to be processed may exist outside the database server 100. In this embodiment, an explanation will be provided mainly about data import and its cache use and any description of other processing will be omitted; however, the configuration related to the cache use can be applied to other processing.

The CPU 110 loads a data processing program(s) into the memory 120 and executes processes included in the program (s), thereby implementing functions of a query execution unit 121, a data input/output unit 122, and a communication unit 123.

The query execution unit 121 generates a query plan based on a query given from a query source (for example, an operator or an application executed inside or outside the database server 100). The query execution unit 121 determines a plan for opening/closing a cache file based on the query plan. When determining the plan, a "mode" is determined for each processing block. The "mode" is a mode for opening/closing a cache file; and specifically, the mode is determined on the basis of opening/closing units (whether to open the entire cache file or a part of the cache file) and an I/O type (what I/O type the input/output to/from data in the cache file is). The "processing block(s)" corresponds to a mode assignment unit(s) and may be a query, a partial query, an execution instance, or a query processing part. The "partial query" may be a query which is split from a query. The "execution instance" may be an instance such as table scanning, table creation, index creation, linking, or selection and the execution instance may be called a database operator or a database operation. The "query processing part" is processing that corresponds to part of a query plan and may be processing composed of one or more execution instances.

The data input/output unit 122 inputs and outputs data when executing a query based on the query plan. For example, the data input/output unit 122 reads a data aggregate (for example, an object) from the low-speed storage 150 through the communication interface 142 and writes the data aggregate to the high-speed storage 130 as a cache file 131. Moreover, during import processing, the data input/output unit 122 opens and closes the cache file 131 in the high-speed storage 130 by using mode information provided from the query execution unit 121. Incidentally, in the description of this embodiment as described above, the import processing is mainly adopted as an example of processing, but the cache file 131 is also opened and closed in processing other than the import processing as necessary.

The communication unit 123 communicates with the high-speed storage 130 and the input/output interface 141. For example, the communication unit 123 may cause information indicating the query plan and mode for each query to be displayed on the display device 101 by the input/output interface 141. Therefore, the operator can become aware of what query plan has been created and what mode has been assigned.

Management information such as a table-state management array 24 is retained in the memory 120.

The high-speed storage 130 is a storage having a higher data I/O speed for the CPU 110 than the low-speed storage 150 (for example, a storage having a shorter response time) and is a non-volatile (or volatile) storage device such as an SSD (Solid State Drive). The high-speed storage 130 stores cache files (CF) 131. The high-speed storage 130 may be part of the memory. Typically, the storage capacity of the high-speed storage 130 is smaller than the storage capacity of the low-speed storage 150. Specifically, the storage capacity of the high-speed storage 130 is not large enough to store all data aggregates (for example, objects) in the low-speed storage 150.

The low-speed storage 150 is a storage having a lower data I/O speed for the CPU 110 than the high-speed storage 130 and retains a plurality of data aggregates. For example, in this embodiment, the low-speed storage 150 retains Tables A and B as import targets. In this embodiment, the low-speed storage 150 is an object storage in the cloud (public cloud). Therefore, an input/output unit(s) to/from the low-speed storage 150 may be an object unit(s). The low-speed storage 150 is not limited to an external storage of the database server 100 like a storage in the cloud, but may be an internal storage of the database server 100. For example, the high-speed storage 130 may be part of the memory and the low-speed storage 150 may be an auxiliary storage device such as an HDD (Hard Disk Drive).

In this embodiment, a "cache file(s)" means a file(s) which is read (cached) from the low-speed storage 150 to the high-speed storage 130. One cache file 131 may be a whole or part of one or more objects.

The query execution unit 121 creates a query plan based on a query from a query source and executes the query according to the query plan. When executing the query, for example, the data input/output unit 122 performs input/output to/from the low-speed storage 150 and input/output to/from the high-speed storage 130, for example, as described below.

<Input/Output to Low-Speed Storage 150>

When a target cache file 131 that is a cache file 131 which is an input/output destination of data does not exist in the high-speed storage 130, the data input/output unit 122 reads an object including a column of the input/output destination of the data from the low-speed storage 150 to the high-speed storage 130 as a cache file 131.

When there is a dirty cache file 131 (a cache file 131 which has been updated in the high-speed storage 130, but has not been reflected in the low-speed storage 150) in the high-speed storage 130, the data input/output unit 122 performs so-called destaging (that is, writing a dirty cache file 131 to the low-speed storage 150 as an object). When the dirty cache file 131 in the high-speed storage 130 is a cache file 131 to which data is input/output when executing a query waiting to be executed (for example, a query accumulated in a queue), the data input/output unit 122 may wait to write the cache file 131 to the low-speed storage 150. Moreover, the cache file 131 to be destaged may be a cache file 131 updated in the query execution and destaging may be performed in the query execution. Alternatively, destaging may be performed asynchronously with the query execution.

<Input/Output to High-Speed Storage 130>

The object is read from the low-speed storage 150 to the high-speed storage 130 as a cache file 131 as described above.

Upon the query execution, the data input/output unit 122 performs an opening operation that is an operation to open a cache file 131 to which data is input/output (written and/or read) in the query execution. In the opening operation on the cache file 131, an open target area of the cache file 131 (for example, the entire cache file 131 or a part of the cache file 131) and an I/O type of input/output to/from for the cache file 131 may be designated. Data in a cache file area opened in response to the opening operation (a whole or part of the cache file 131) is read to the memory 120 (for example, a work area). Data is input/output to/from the data read from the cache file area to the memory 120, and the updated data in the memory 120 is stored in the cache file 131. Upon the query execution, the data input/output unit 122 performs a closing operation to close the open area of the cache file 131. The cache file area is closed in response to the closing operation. The dirty cache file 131 in a closed state is destaged to the low-speed storage 150.

Figure 2A:
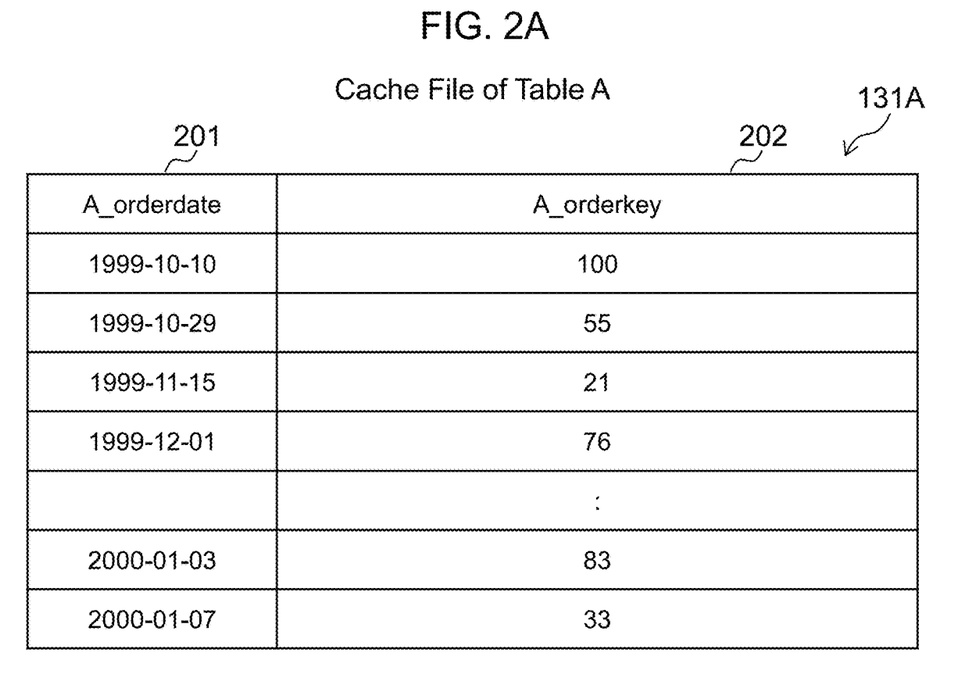
FIG. 2A illustrates a specific example of a cache file.
Figure 2B:
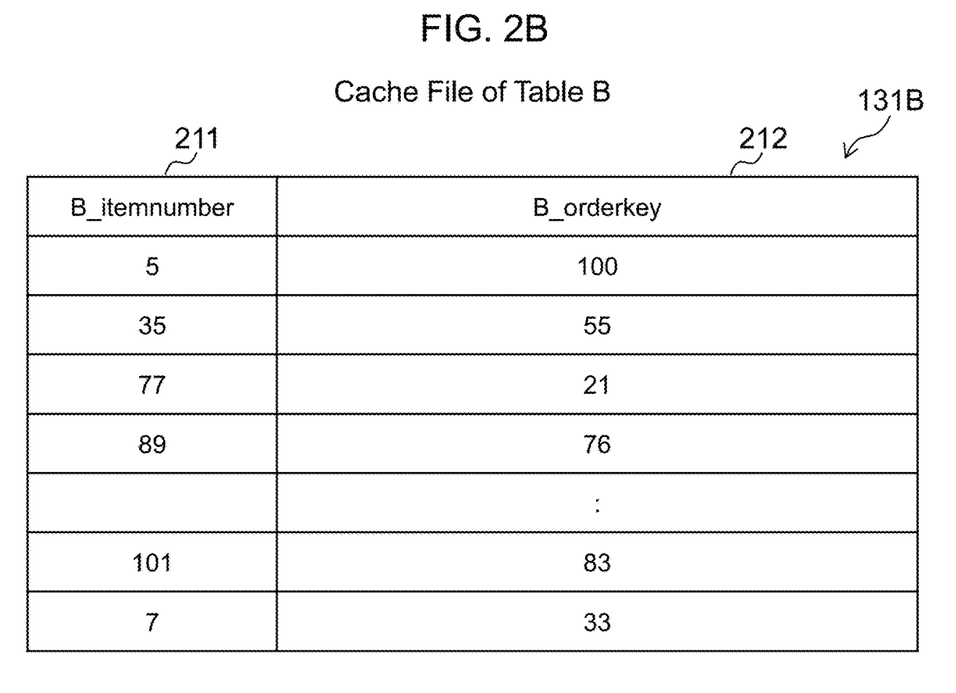
FIG. 2B illustrates a specific example of a cache file.

FIGS. 2A and 2B show specific examples of cache files, respectively.

A cache file 131A illustrated in FIG. 2A is a cache file of Table A to be imported and specifically retains columns such as an order year and month (A_orderdate) 201 and an order number (A_orderkey) 202.

A cache file 131B illustrated in FIG. 2B is a cache file of Table B to be imported, and specifically retains columns such as an item number (B_itemnumber) 211 and an order number (B_orderkey) 212.

In this embodiment, a cache file includes the entire table in a database. Therefore, there is a one-to-one correspondence between the table and the cache file 131. However, the cache file 131 may include some columns (or rows) of one table and, therefore, there may be a plurality of cache files 131 per table.

Figure 3:
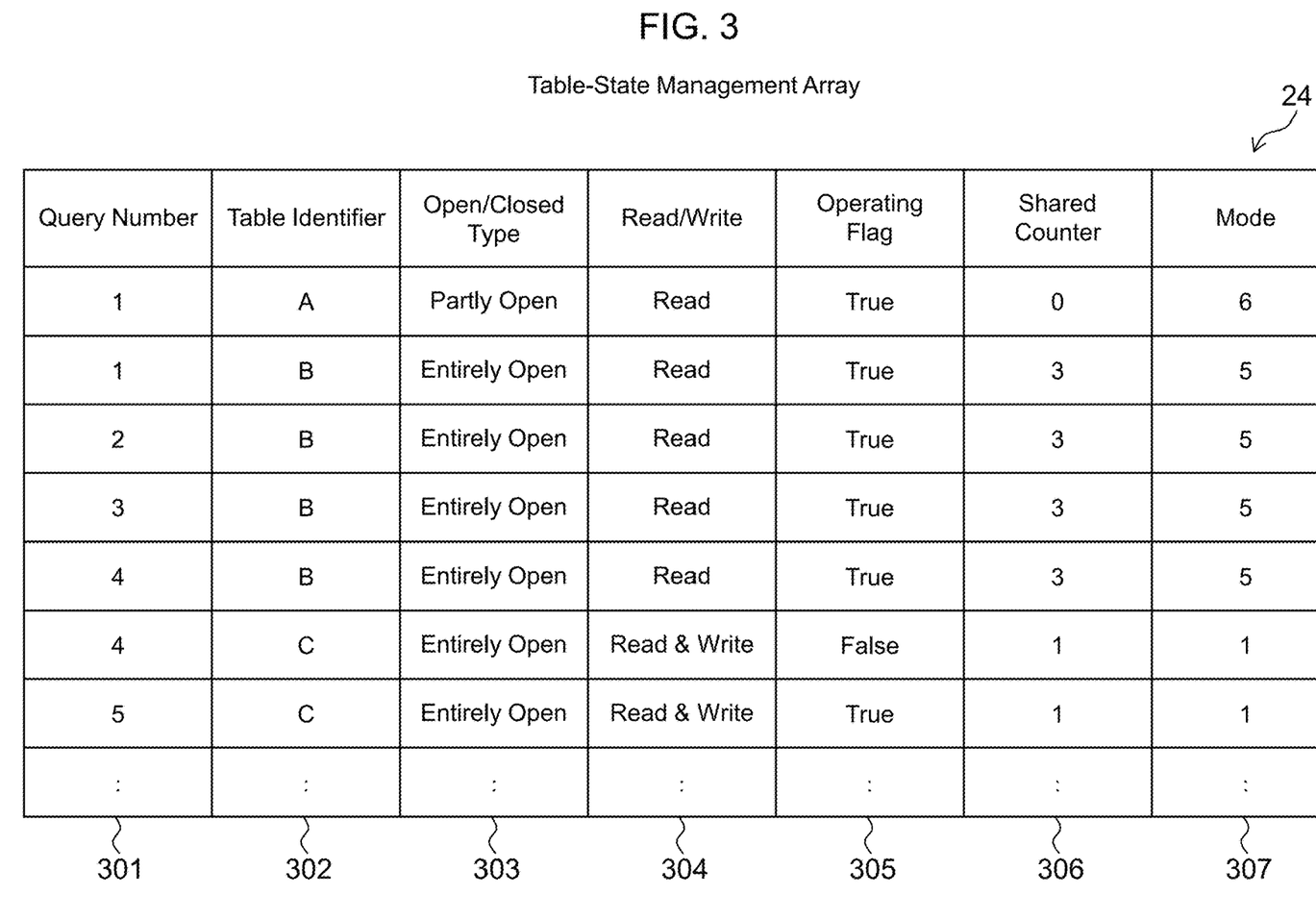
FIG. 3 illustrates a specific example of a table-state management array.

FIG. 3 illustrates a specific example of a table-state management array 24.

The table-state management array 24 has a row for each processing block and a row retains information such as a query number 301, a table identifier 302, an open/closed type 303, read/write 304, an operating flag 305, a shared counter 306, and a mode 307.

The query number 301 indicates an identification number of a query. The table identifier 302 indicates an identifier of a table.

The open/closed type 303 indicates an open/closed type of the open/closed area of the cache file 131. Regarding each processing block, the "open/closed area" is an area that is a whole or part of the cache file 131 which has been read to the high-speed storage 130, and includes an area to store input/output data. As values of the open/closed type 303, there are, for example, "Partly Open" indicating that a part of the cache file 131 is to be opened/closed, and "Entirely Open" indicating that the entire cache file 131 is the target to be opened/closed. Furthermore, as a value of the open/closed type 303, there is "Entirely Open Throughout The Entire Processing."

The read/write 304 indicates whether the input/output that occurs during the query execution is read-only ("Read"), write-only ("Write"), or both read and write ("Read & Write").

The operating flag 305 indicates whether the query is being executed ("True") or not ("False"). When the query execution starts, the operating flag 305 becomes "True." When the query execution terminates, the operating flag 305 becomes "False."

The shared counter 306 indicates the number of other queries using the table. When the shared counter 306 is "0," it means that the table is not used by another query. The mode 307 indicates a mode number.

Figure 4:
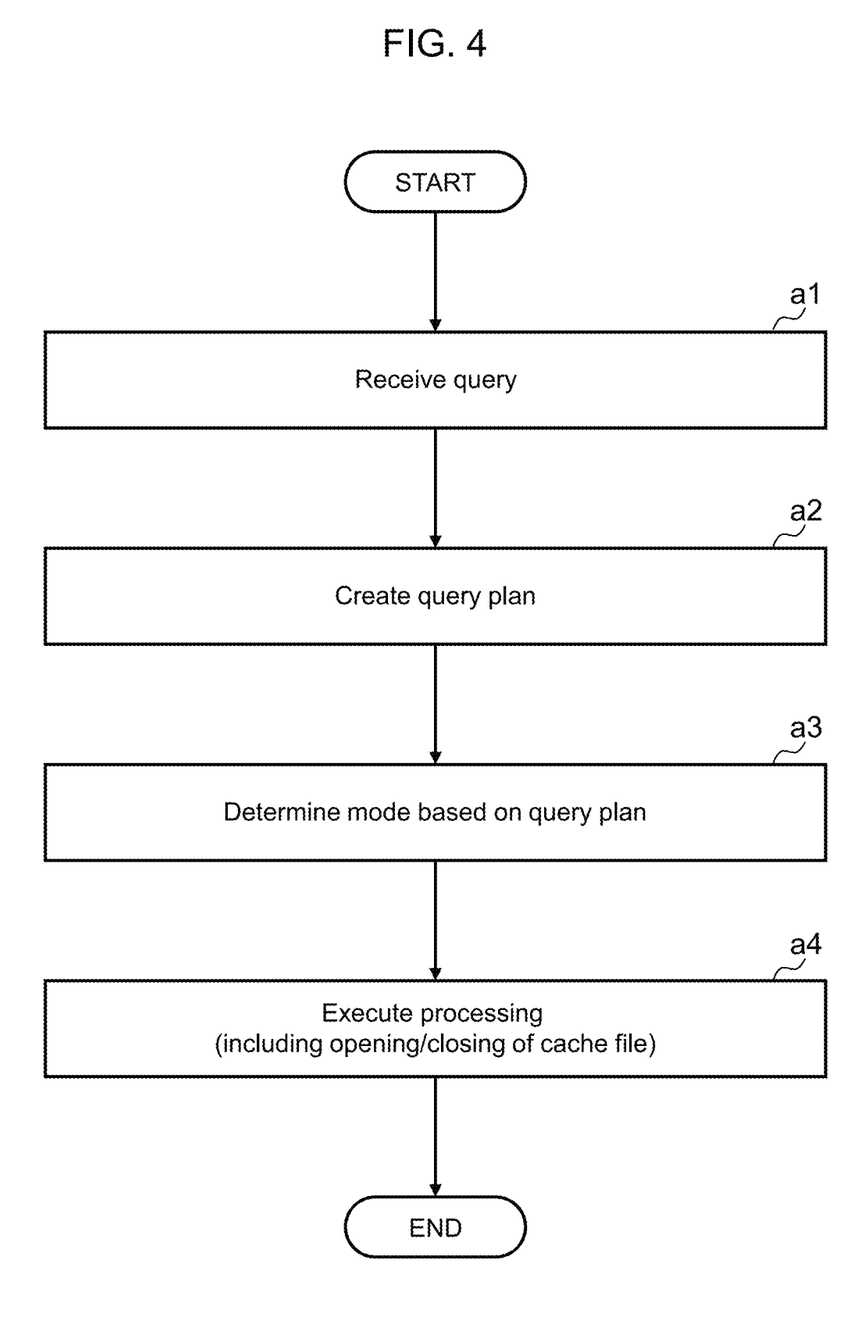
FIG. 4 is a flowchart illustrating an example of import processing according to an embodiment.

FIG. 4 is a flowchart illustrating an example of import processing.

(Step a1) The query execution unit 121 receives a query. The received query may be associated with information indicating a time stamp of the query (for example, a reception date and time of the query) and accumulated in the memory 120.

(Step a2) The query execution unit 121 creates a query plan based on the recei8ed query. The created query plan is associated with the query number of the query and accumulated in the memory 120.

(Step a3) The query execution unit 121 determines a mode based on the created query plan.

(Step a4) The data input/output unit 122 executes the import processing. By the import processing, the data input/output unit 122 opens/closes a whole or part of the cache file 131 based on the mode determined in step a3. Incidentally, the import processing is an example of processing performed in the query execution.

Figure 5:
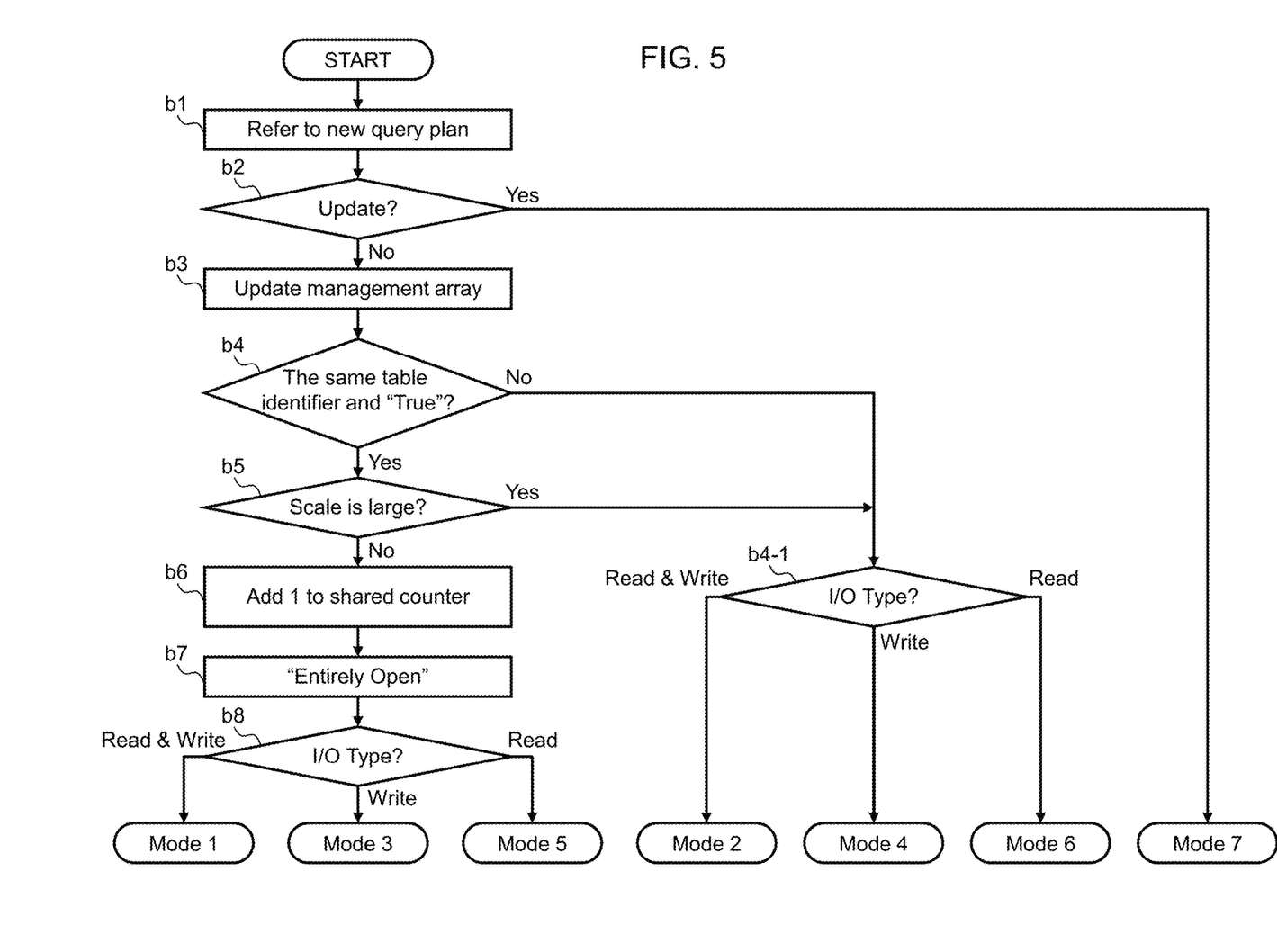
FIG. 5 is a flowchart of step a3 (mode determination) in FIG. 4.

FIG. 5 is a flowchart illustrating step a3 (mode determination) in FIG. 4.

(Step b1) The query execution unit 121 refers to a new query plan. The "new query plan" is a query plan based on a query whose mode has not yet been determined. When there are a plurality of new query plans, a query plan corresponding to the query with the oldest query reception date and time may be used. In the description of FIG. 5, the "new query plan" hereinafter refers to the query plan referenced to in step b1. Moreover, a query corresponding to the "new query plan" may be hereinafter sometimes referred to as a "new query."

(Step b2) The query execution unit 121 judges whether or not the query of the new query plan referenced to in step b1 is an update. The "update" herein used may be, for example, any one of an import, a deletion, and an update regarding database processing. If the judgment result in step b2 is true (step b2: Yes), the query execution unit 121 assigns Mode 7 to the query corresponding to the new query plan referenced to in step b1.

(Step b3) If the judgment result in step b2 is false (step b2: No), the query execution unit 121 registers the query number corresponding to the new query plan and the table identifier of the relevant table in the table-state management array 24 based on the new query plan referenced to in step b1 and the table to which data is input/output based on the new query plan. Under this circumstance, one or more rows are added for the new query. For example, when data is input/output to/from the data of a plurality of tables upon the execution of a new query, a row for each of the plurality of tables is added to the table-state management array 24. When the new query is executed, the operating flag 305 is "True" in the added row.

(Step b4) The data input/output unit 122 judges whether or not the table-state management array 24 contains a row having the same table identifier as the table identifier registered in step b3, and whether or not a query corresponding to the relevant row (a query different from the new query) is currently in operation (whether or not the operating flag 305 is "True"). If the same table identifier does not exist or if it is not identified that the same table identifier is currently operating, the judgment result of step b4 is false (step b4: No) and the processing proceeds to step b4-1. If the same table identifier exists and it is identified that the same table identifier is currently operating, the judgment result of step b4 is true (step b4: Yes) and the processing proceeds to step b5.

(Step b4-1) The query execution unit 121 determines a mode for the set of Yes in step b4 (the set of the new query and the table) based on the open/closed type 303 "Partly Open" of the relevant table and the I/O type of the new query. Specifically, the open/closed type 303 is "Partly Open," so the mode becomes as follows according to the I/O type.

If the I/O type is read & write (the read/write 304 is "Read & Write"), the mode 307 is "Mode 2."

If the I/O type is write-only (the read/write 304 is "Write"), the mode 307 is "Mode 4."

If the I/O type is read-only (the read/write 304 is "Read"), the mode 307 is "Mode 6."

(Step b5) The query execution unit 121 judges whether or not the scale of the new query and all other queries corresponding to the same table identifier as that of the new query (the scale of all queries using the same table) is large. If the query scale is not large (step b5: No), the processing proceeds to step b6. If the query scale is large (step b5: Yes), the processing proceeds to step b4-1. Incidentally, "the query scale is large" means that it exceeds a scale threshold of the query scale. The scale threshold may be a threshold of a parameter value for each of one or more parameters belonging to the query scale (for example, a size of the query plan) and may be determined in advance based on hardware specifications of the database server 100 (for example, hardware specifications such as CPU 110). For example, even if the query scale is the same, if machine specifications are high, it may be determined that the query scale is not large; and if the machine specifications are low, it may be determined that the query scale is large.

(Step b6) The query execution unit 121 adds one to the value indicated by the shared counter 306 of each row having the same table identifier (the row corresponding to the new query and other queries).

(Step b7) If there is a row in which the value of the shared counter 306 is equal to or greater than "1" among the rows in which the shared counter 306 is updated in step b6, the query execution unit 121 changes the value of the open/closed type 303 of the relevant row from "Partly Open" to "Entirely Open." As a result, the open/closed type 303 is "Entirely Open" for the row corresponding to the combination of the new query and the relevant table (the table accessed in the execution of the new query).

(Step b8) The query execution unit 121 determines a mode for the pair of the new query and the relevant table based on the open/closed type 303 "Entirely Open" and the I/O type of the new query. Specifically, the open/closed type 303 is "Entirely Open," so the mode becomes as follows according to the I/O type.

If the I/O type is read & Write (the read/write 304 is "Read & Write"), the mode 307 is "Mode 3."

If the I/O type is write-only (the read/write 304 is "Write"), the mode 307 is "Mode 5."

If the I/O type is read-only (the read/write 304 is "Read"), the mode 307 is "Mode 7."

Incidentally, in step b8, the query execution unit 121 changes the value of the mode 307 of the row having the same table identifier as that of the relevant table to the value of the same mode 307 as the relevant table.

Figure 6:
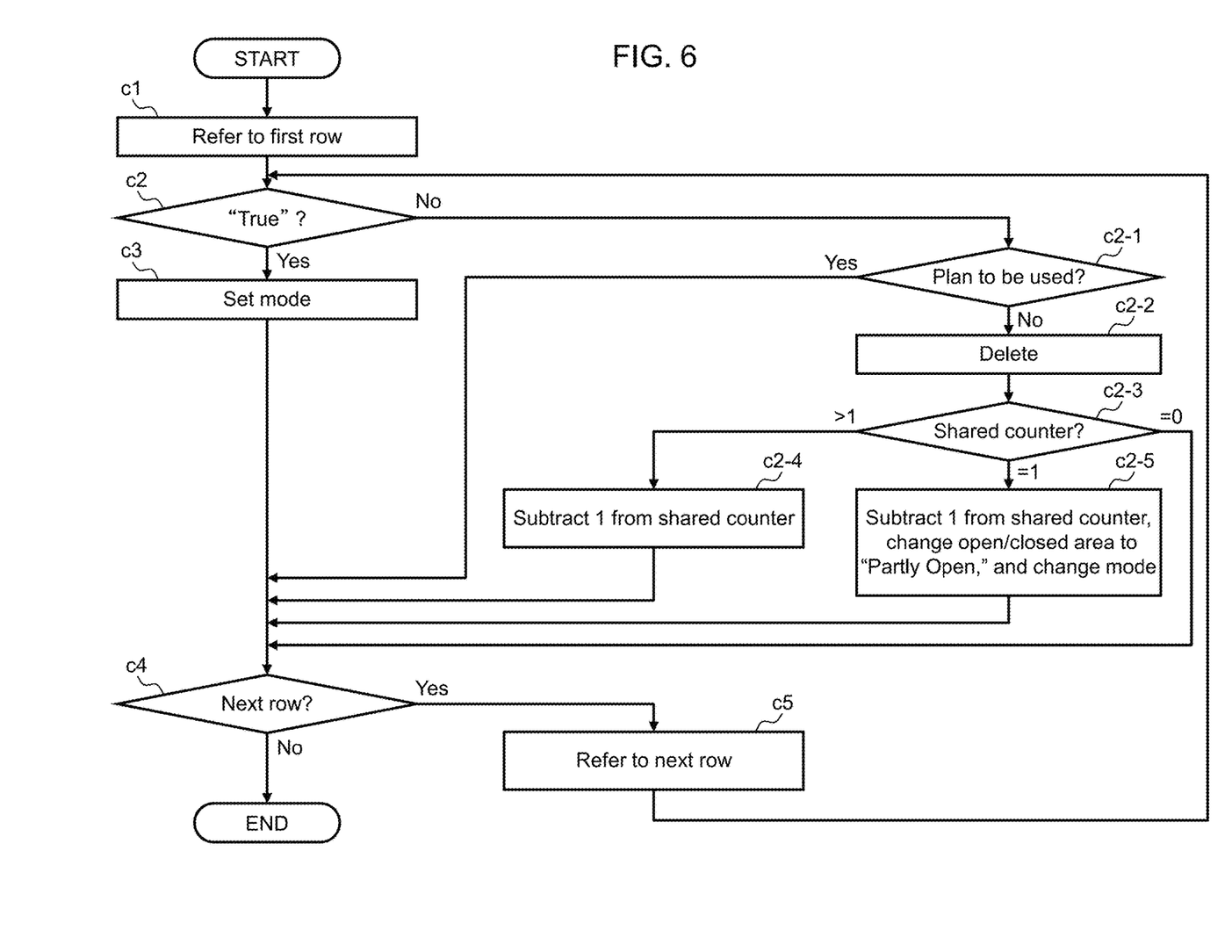
FIG. 6 is a flowchart of open/closed area management in step a4 in FIG. 4.

FIG. 6 is a flowchart illustrating the open/closed area management in step a4 of FIG. 4.

(Step c1) The query execution unit 121 refers to a first row of the table-state management array 24.

(Step c2) The query execution unit 121 judges whether or not the operating flag 305 of the referenced row is "True." If the operating flag 305 is "True" (step c2: Yes), the processing proceeds to step c3. If the operating flag 305 is "False" (step c2: No), the processing proceeds to step c2-1. In the description of FIG. 6 below, the row referenced in step c1 or c5 (the most recently referenced row) will be hereinafter referred to as a "referenced row."

(Step c2-1) The query execution unit 121 judges whether or not the relevant table (the table corresponding to the table identifier 302 of the referenced row) is a table scheduled to be used (accessed) for the query waiting in the queue. The judgment of whether or not the relevant table is scheduled to be used may be a judgment of whether or not the same table identifier as that of the relevant table is in the row corresponding to the waiting query. If the table is scheduled to be used (step c2-1: Yes), the processing proceeds to step c4. If the table is not scheduled to be used (step c2-1: No), the processing proceeds to step c2-2.

(Step c2-2) The query execution unit 121 deletes the table identifier 302 of the relevant table from the referenced row of the table-state management array 24.

(Step c2-3) The query execution unit 121 checks whether the shared counter 306 in the referenced row is "2" or more, "1," or "0." If the shared counter 306 in the referenced row is "2" or more, the processing proceeds to step c2-4. If the shared counter 306 in the referenced row is "1," the processing proceeds to step c2-5. If the shared counter 306 in the referenced row is "0," the processing proceeds to step c4.

(Step c2-4) The query execution unit 121 subtracts one from the shared counter 306 in the row having the same table identifier 302 as the table identifier 302 deleted in step c2-2.

(Step c2-5) The query execution unit 121 subtracts one from the shared counter 306 in the row having the same table identifier 302 as the table identifier 302 deleted in step c2-2, changes the open/closed type 303 in the same row to "Partly Open," and changes the mode 307 in the same row. The value of the changed mode 307 is based on the open/closed type 303 "Partly Open" and the value of the read/write 304 in the same row.

(Step c3) The query execution unit 121 sets the mode according to the mode 307 in the referenced row. In this step, the value of the mode 307 is set in a specified area of the memory 120, and processing corresponding to the referenced row is performed. In the relevant processing, opening/closing of the cache file is controlled according to the set mode.

(Step c4) The query execution unit 121 judges whether or not there is a row next to the referenced row in the table-state management array 24. If there is a next row (step c4: Yes), the processing proceeds to step c5. If there is no next row (step c4: No), the processing terminates.

(Step c5) The query execution unit 121 refers to the row next to the referenced row. By recognizing the next row as the referenced row, the processing proceeds to step c2.

According to the example illustrated in FIG. 6, the rows in the table-state management array 24 are referenced sequentially from the top row, but the reference order of the rows in the table-state management array 24 may not be limited to the sequential order from the top row.

Figure 7:
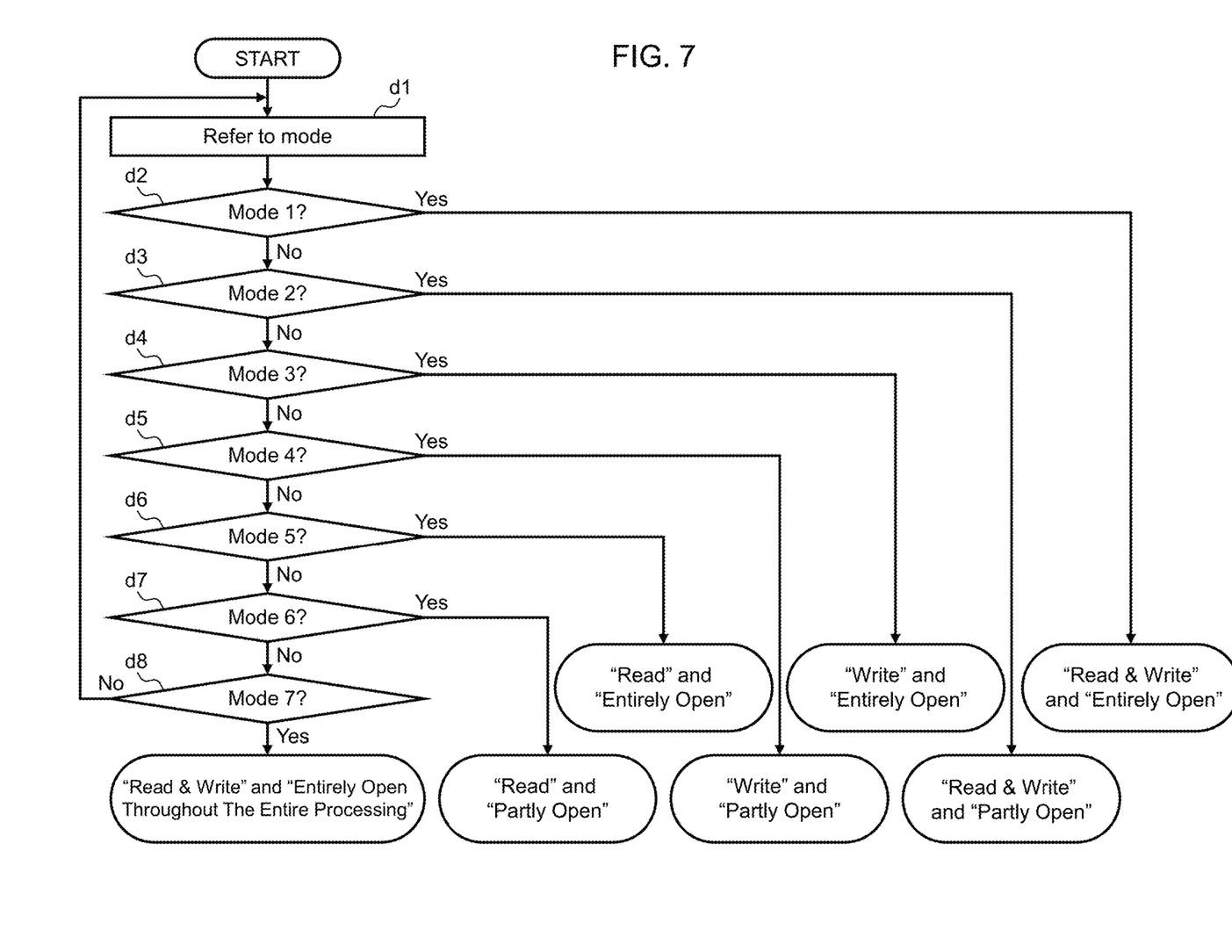
FIG. 7 is a flowchart of step c3 in FIG. 6.

FIG. 7 is a flowchart of step c3 in FIG. 6.

(Step d1) The query execution unit 121 refers to the mode 307 (set mode) of a target processing block to be executed.

(Step d2) If the value of the mode 307 is "Mode 1," the query execution unit 121 opens and closes the cache file 131 by "Read & Write" and "Entirely Open."

(Step d3) If the value of the mode 307 is "Mode 2," the query execution unit 121 opens and closes the cache file 131 by "Read & Write" and "Partly Open."

(Step d4) If the value of the mode 307 is "Mode 3," the query execution unit 121 opens and closes the cache file 131 by "Write" and "Entirely Open."

(Step d5) If the value of the mode 307 is "Mode 4," the query execution unit 121 opens and closes the cache file 131 by "Write" and "Partly Open."

(Step d6) If the value of the mode 307 is "Mode 5," the query execution unit 121 opens and closes the cache file 131 by "Read" and "Entirely Open."

(Step d7) If the value of the mode 307 is "Mode 6," the query execution unit 121 opens and closes the cache file 131 by "Read" and "Partly Open."

(Step d8) If the value of the mode 307 is "Mode 7," the query execution unit 121 opens and closes the cache file 131 by "Read & Write" and "Entirely Open Throughout The Entire Processing." The "Entire Processing" is the processing of the entire query.

Accordingly, metadata such as the query number 301, the table identifier 302, the open/closed type 303, and the read/write 304 are collected in the table-state management array 24 as a preliminary step of mode determination for the area open/closed management. Therefore, the mode determination is quickly performed.

Moreover, the mode for opening/closing the area suited for each processing block is assigned as described above. Therefore, it is possible to perform data processing for implementing the appropriate processing speed, the reliability, and the memory usage.

Although one embodiment has been described above, this is an example for describing the present invention and it is not intended to limit the scope of the invention only to this embodiment. The present invention can also be implemented in various other embodiments.

Moreover, the above description can be summarized as follows. The following summary may include a supplementary explanation of the above description and an explanation of variations.

The database server 100 (an example of the data processing apparatus) has the memory 120, the high-speed storage 130 (an example of the first storage apparatus), and the CPU 110 (an example of the processor) coupled to them. The CPU 110 executes a program(s) (software for implementing the database management system including, for example, functions such as the query execution unit 121, the data input/output unit 122, and the communication unit 123) to perform the following processing.

The CPU 110 reads an object (an example of a data area) of input/output data from the low-speed storage 150 to the high-speed storage 130. The object which is read to the high-speed storage 130 is a cache file 131 (an example of the data area).

The CPU 110 performs an opening operation on the cache file 131 to open an open/closed area (an area which is a whole or part of the cache file 131 read to the high-speed storage 130 and includes an area to store the input/output data).

The CPU 110 reads data from the open/closed area, which is opened, to the memory 120.

The CPU 110 inputs/outputs data to/from the data read to the memory 120.

If the data in the memory 120 is updated, the CPU 110 stores the updated data in the open/closed area in an open state in the high-speed storage 130.

The CPU 110 performs a closing operation on the cache file 131 having the open/closed area in order to close the open/closed area in the high-speed storage 130.

The CPU 110 stores the closed cache file 131 (dirty cache file 131), which includes the updated data and exists in the high-speed storage 130, in the low-speed storage 150.

Regarding each processing block, the CPU 110 determines whether the open/closed area type indicating the open/closed area for processing of a first processing block which is the processing block should be an entire area or a partial area of the cache file 131, based on whether or not the cache file 131 which is input/output by the processing of the first processing block can also be accessed by processing of a second processing block which is a processing block other than the first processing block, and whether or not the second processing block is being executed (that is, based on the judgment result of step b4). As a result, opening/closing of the data area is realized to make the processing speed, the reliability, and the memory usage appropriate. Incidentally, the opening operation on the cache file 131 including the open/closed area for the processing of the first processing block may be performed according to the open/closed area type of the first processing block.

If the cache file 131 which is input/output by the processing of the first processing block cannot be accessed by the processing of the second processing block or the second processing block is not being executed (if the judgment result of step b4 is false), the open/closed area may be a partial area of the cache file 131. In such a case, the input/output range of the cache file 131 is limited to the input/output range in the first processing block and, therefore, it is appropriate to set the open/closed area as a partial area of the cache file 131.

If the cache file 131 which is input/output by the processing of the first processing block can also be accessed by the processing of the second processing block and the second processing block is being executed (if the judgment result of step b4 is true), the open/closed area may be the entire area of the cache file 131. In such a case, the input/output range of the cache file 131 must include the input/output range in the second processing block besides the input/output range of the first processing block and, therefore, it is efficient to set the open/closed area as the entire area of the cache file 131 which covers the above-mentioned ranges.

Even if the cache file 131 which is input/output by the processing of the first processing block can also be accessed by the processing of the second processing block and the second processing block is being executed (even if the judgment result of step b4 is true), if the size of a query for which processing including the first processing block is executed (an example of a request) and a query for which processing including the second processing block is executed exceeds a scale threshold determined based on specifications of hardware including the CPU 110 and the memory 120 (if the judgment result of step b5 is true), the open/closed area may be a partial area of the cache file 131. As a result, even if the scale of the query/queries is large, the amount of data which is read to the memory 120 can be suppressed.

For example, in step c3, if the processing of the first processing block terminates and there is no second processing block which is being executed (for example, if the value of the shared counter 306 corresponding to the first processing block is 0), the CPU 110 may perform the closing operation on the cache file 131 including the open/closed area for the processing of the first processing block according to the open/closed area type of the first processing block. As a result, the cache file 131 is closed at an appropriate timing and, therefore, an improvement in the reliability can thereby be expected.

If the first processing block is not executed, the CPU 110 may perform the following processing. Specifically speaking, if the open/closed area type of the second processing block indicates that the open/closed area in the second processing block is the entire area and the open/closed area for processing blocks other than the second processing block is not included in the cache file 131 ("=1" in step c2-3), the CPU 110 may change the open/closed area type of the second processing block to indicate that the open/closed area is a part of the cache file 131 (step c2-5). As a result, it is possible to appropriately open/close the cache file 131 in the processing when the second processing block eventually becomes the first processing block.

The mode that influences the opening operation on the cache file 131 including the open/closed area for the first processing block may depend on the open/closed area type of the first processing block and the input/output type for the first processing block. As a result, more appropriate opening/closing of the cache file can be expected.

As the mode(s) that influences the opening operation on the cache file 131 including the open/closed area for the first processing block, besides Modes 1 to 6 depending on the open/closed area type of the first processing block and the input/output type for the first processing block, there is Mode 7 corresponding to a query type regarding which processing including the first processing block is performed. In Mode 7, if the query is an update query, all areas of all cache files 131 which are input/output by the relevant query are kept open throughout the processing of the query. As a result, it can be expected to maintain the processing speed, the reliability, and the memory usage appropriately during the processing of the update query.

The invention claimed is:

1. A data processing apparatus for inputting and outputting data in response to a request, comprising:
   a memory;
   a first storage apparatus;
   an interface apparatus coupled to a second storage apparatus which has a data input/output speed lower than that of the first storage apparatus and stores a plurality of data areas; and
   a processor coupled to the first storage apparatus and the interface apparatus, wherein the processor is designed to:
   read a data area of input/output data from the second storage apparatus to the first storage apparatus;

perform an opening operation to open an open/closed area that is an area which is a whole or part of the data area read to the first storage apparatus and includes an area to store the input/output data;
read data from the open/closed area, which is opened, to the memory;
input/output data to/from the data read to the memory;
upon an update of the data in the memory, store the updated data in the open/closed area in an open state in the first storage apparatus;
perform a closing operation on the data area having the open/closed area to close the open/closed area in the first storage apparatus; and
store the closed data area, which includes the updated data and exists in the first storage apparatus, in the second storage apparatus,
wherein regarding each processing block, the processor determines an open/closed area type indicating whether the open/closed area for processing of a first processing block which is the processing block should be an entire area or a partial area of the data area, based on whether or not the data area which is input and/or output by the processing of the first processing block can also be accessed by processing of a second processing block which is a processing block other than the first processing block and whether or not the second processing block is being executed.

2. The data processing apparatus according to claim 1,
wherein if the data area which is input and/or output by the processing of the first processing block cannot be accessed by the processing of the second processing block or if the second processing block is not being executed, the open/closed area is the partial area of the data area.

3. The data processing apparatus according to claim 1,
wherein if the data area which is input and/or output by the processing of the first processing block can also be accessed by the processing of the second processing block and the second processing block is being executed, the open/closed area is the entire area of the data area.

4. The data processing apparatus according to claim 3,
wherein even if the data area which is input and/or output by the processing of the first processing block can also be accessed by the processing of the second processing block and the second processing block is being executed, if a scale of a request for which processing including the first processing block is executed and a request for which processing including the second processing block is executed exceeds a scale threshold determined based on specifications of hardware including the processor and the memory, the open/closed area is the partial area of the data area.

5. The data processing apparatus according to claim 3,
wherein if the first processing block is not being executed, the processor changes the open/closed area type of the second processing block so that the open/closed area of the second processing block becomes the entire area of the data area; and
if the open/closed area for a processing block other than the second processing block is not included in the data area, the processor changes the open/closed area type of the second processing block so that the open/closed area becomes the partial area of the data area.

6. The data processing apparatus according to claim 1,
wherein if the processing of the first processing block has terminated and there is no second processing block being executed, the processor performs the closing operation on the data area including the open/closed area regarding the processing of the first processing block according to the open/closed area type of the first processing block.

7. The data processing apparatus according to claim 1,
wherein a mode that influences the opening operation on the data area including the open/closed area for the first processing block depends on the open/closed area type of the first processing block and an input/output type for the first processing block.

8. The data processing apparatus according to claim 7,
wherein as the mode that influences the opening operation on the data area including the open/closed area for the first processing block, there is a mode corresponding to a request type for which the processing including the first processing block is performed, besides the mode depending on the open/closed area type of the first processing block and the input/output type for the first processing block.

9. The data processing apparatus according to claim 8,
wherein the mode corresponding to the request type for which the processing including the first processing block is performed is a mode in which when the request is an update query, all areas of all data areas which are input and/or output by the query are kept open throughout processing of the query.

10. The data processing apparatus according to claim 1,
wherein the request is a request for inputting data to, and/or outputting data from, one or more tables in a database.

11. A data processing method performed by a data processing apparatus including a memory and a first storage apparatus and for inputting and outputting data in response to a request,
wherein the data processing apparatus is designed to:
read a data area of input/output data from a second storage apparatus, which has a data input/output speed lower than that of the first storage apparatus and stores a plurality of data areas, to the first storage apparatus;
perform an opening operation to open an open/closed area that is an area which is a whole or part of the data area read to the first storage apparatus and includes an area to store the input/output data;
read data from the open/closed area, which is opened, to the memory;
input/output data to/from the data read to the memory;
upon an update of the data in the memory, store the updated data in the open/closed area in an open state in the first storage apparatus;
perform a closing operation on the data area having the open/closed area to close the open/closed area in the first storage apparatus; and
store the closed data area, which includes the updated data and exists in the first storage apparatus, in the second storage apparatus,
wherein regarding each processing block, the data processing method determines an open/closed area type indicating whether the open/closed area for processing of a first processing block which is the processing block should be an entire area or a partial area of the data area, based on whether or not the data area which is input and/or output by the processing of the first processing block can also be accessed by processing of a second processing block which is a processing block other than the first processing block and whether or not the second processing block is being executed.

\* \* \* \* \*